United States Patent [19]

Spirig

[11] 4,194,705
[45] Mar. 25, 1980

[54] DESOLDERING WICK PACKAGE AND IMPROVED BOBBIN UTILIZED THEREIN

[76] Inventor: Ernst Spirig, Movenstrasse 37, CH-8640 Rapperswil, Switzerland

[21] Appl. No.: 947,841

[22] Filed: Sep. 29, 1978

[51] Int. Cl.² .............................................. B65H 49/18
[52] U.S. Cl. .................................................... 242/137
[58] Field of Search .................. 242/118, 41, 118, 7, 242/128, 137–138; 219/9.5, 58, 130; 206/389, 409

[56] References Cited

U.S. PATENT DOCUMENTS

| | | | |
|---|---|---|---|
| 1,588,385 | 6/1926 | Miller | 242/138 |
| 2,529,501 | 11/1950 | Johnston | 242/71.8 |
| 3,430,886 | 3/1969 | Sweeney | 242/118.7 |
| 3,815,843 | 6/1974 | Fortune | 242/137.1 |

*Primary Examiner*—Leonard D. Christian
*Attorney, Agent, or Firm*—Cushman, Darby & Cushman

[57] ABSTRACT

A package comprising a length of strand material in the form of a desoldering wick of braided wire having a coating of rosin thereon, a unitary annular body molded of plastic material including a central hub, first and second sides, and first and second continuous rims, the hub, sides and rims defining an annular chamber receiving therein the length of strand material in coil formation, the rims defining a continuous annular slot communicating with the outer periphery of the annular chamber of a size to permit the free end portion of the length of strand material in coil formation to extend therethrough in controllably engaged fashion. The first side has a plurality of first annularly spaced portions defining a plurality of first axially extending openings communicating with the annular chamber so as to provide for the free exterior communication of the exposed surfaces of a coil of strand material contained therein and the second side has a plurality of second annularly spaced portions defining a plurality of second axially extending openings communicating with the annular chamber so as to provide for the free exterior communication of the exposed surfaces of a coil of strand material contained therein. The first annularly spaced portions are axially accessible through the second openings, while the second annularly spaced portions are axially accessible through the first openings.

9 Claims, 5 Drawing Figures

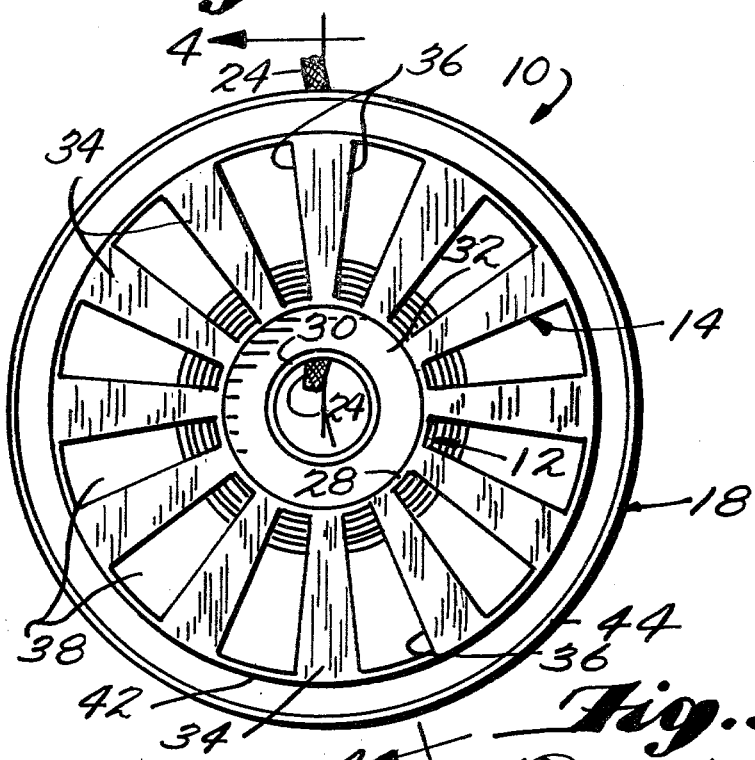
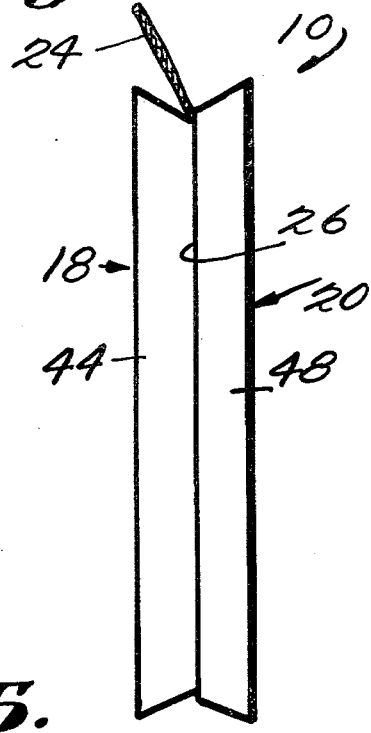
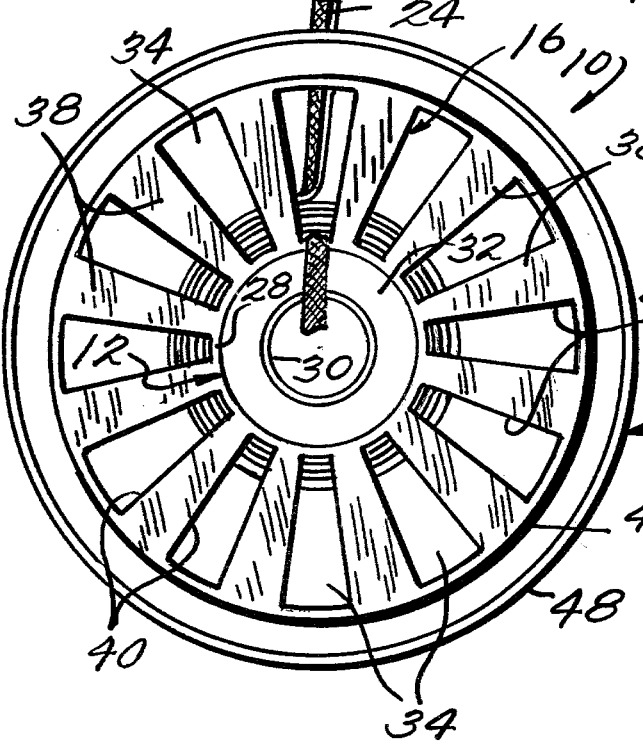
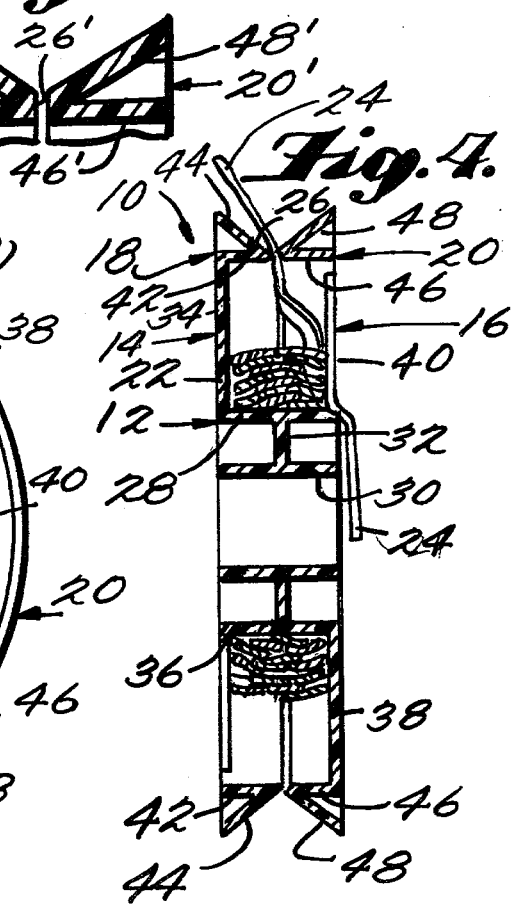

DESOLDERING WICK PACKAGE AND IMPROVED BOBBIN UTILIZED THEREIN

This invention relates to the art of desoldering and more particularly to an improved package including a desoldering wick and a bobbin or reel construction for handling the desoldering wick in a coil formation. The invention also relates to the bobbin or reel construction itself as it may be useful in handling lengths of strand material in coil formation other than desoldering wicks, as for example, wires, lines, yarns, etc.

In the handling of strand material in coil formation, it is frequently desired to provide for some sort of yieldable restraint to the end portion of the strand material extending from the coil tangentially outwardly therefrom. An example of the need for such function is in the handling of strand material in the form of a braided wick for purposes of desoldering or the like. Examples of wicks of this type are disclosed in U.S. Pat. Nos. 3,627,191; 3,715,797; 4,078,714; and 4,081,575. Additional background information with respect to desoldering wicks of the type herein contemplated is disclosed in my co-pending U.S. patent application Ser. No. 849,616, filed Nov. 8, 1977. The disclosures of the above patents and application are herein incorporated by reference into the present specification for purposes of background.

At present, desoldering wicks are handled on bobbins or reels constructed in accordance with the teachings contained in U.S. Pat. No. 3,430,886. The bobbin disclosed in this patent consists essentially of a one-piece plastic molding having a hub and one flat disc-shaped side wall, the other side wall being saucer-shaped, the saucer-shaped side wall being capable of a snap action movement between two self-biased positions. In one position, the saucer-shaped side wall is disposed axially outwardly of the hub, thus providing full peripheral access to the hub. In the other position, the saucer-shaped wall extends in surrounding relation to the hub with its periphery closely adjacent the outer periphery of the disc-shaped side wall so as to controllably engage the end portion of the strand material extending from the coil formation around the hub.

While this bobbin construction has proven satisfactory in actual use in handling desoldering wick strand material, there are certain disadvantages presented by virtue of the inherent configuration of the bobbin. Specifically, as disclosed in my U.S. Pat. No. 4,081,575, it is desirable from a production economy viewpoint to provide for drying of the rosin coating on the wick at a point in time after the wick has been wound on the bobbin. To facilitate this purpose it is necessary to provide for the free passage of air into and out of the annular chamber on the bobbin in which the coil formation is wound.

With the above in mind it is an object of the present invention to provide a bobbin for handling a length of strand material, such as a desoldering wick, in coil formation which secures a highly desirable ventilating effect for the purposes noted above and which also secures controlled engagement of the end portion of the wick extending tangentially outwardly from the coil formation and which provides these functional capabilities in a unitary annular body molded of plastic material.

In accordance with the principles of the present invention, this objective is obtained by molding a body with a central hub and first and second sides extending radially outwardly from the hub in axially spaced relation with respect to one another and with the sides including continuous first and second peripheral portions defining a continuous strand controlling slot. The unitary annular body of plastic material is molded so that the first side has a plurality of first annularly spaced portions extending between the first peripheral portion thereof and the hub, the first annularly spaced portions defining a plurality of first axially extending openings in the first side communicating with the annular chamber which receives the coil formation so as to provide for the free exterior communication of the exposed surfaces of a coil of strand material contained therein. The second side has a plurality of second annularly spaced portions extending between the second peripheral portion thereof and the hub, these spaced portions defining a plurality of second annularly extending openings in the second side communicating with the annular chamber so as to provide for the free exterior communication of the exposed surfaces of a coil of strand material contained therein. The first annularly spaced portions have first interior surfaces defining closed portions of the first side of the annular chamber all of which are axially accessible through the second openings and the second annularly spaced portions have second interior surfaces defining closed portions of the second side of the annular chamber, all of which are axially accessible through the first openings. In this way all of the aforesaid desirable functions are achieved in a configuration of a unitary annular body molded of plastic material. Thus, the economies of one-piece molding are secured in a construction which provides all of the functional capabilities of a one-piece bobbin construction such as disclosed in U.S. Pat. No. 3,430,886 and at the same time securing the ventilation function. In addition, rather than requiring a positive snap action movement of a saucer shaped wall from an opened winding position to a closed unwinding position, the present reel can be opened during winding by simply deflecting the rims away from one another with conical roller means or the like which, after winding has been accomplished, are moved out of pressing relation to the rims, enabling the same to automatically revert to their normal position.

Moreover, the side openings provide for the convenient extension of the inner end of the strand material outwardly so as to be conveniently engaged by an electrical connector when practicing the invention of U.S. Pat. No. 4,078,714.

Another object of the present invention is the provision of a package including a length of strand material in the form of a desoldering wick of braided metal coated with rosin wound in coil formation on a bobbin of the type described.

These and other objects of the present invention will become more apparent during the course of the following detailed description and appended claims.

The invention may best be understood with reference to the accompanying drawings, wherein an illustrative embodiment is shown.

In the drawings:

FIG. 1 is a left-hand side elevational view of a desoldering wick and bobbin package embodying the principles of the present invention;

FIG. 2 is a right-hand side elevational view of the package shown in FIG. 1;

FIG. 3 is an end view of the package;

FIG. 4 is a sectional view taken along the line 4—4 of FIG. 1; and

FIG. 5 is an enlarged fragmentary sectional view showing a modified rim construction which may be incorporated in the bobbin device.

Referring now more particularly to FIGS. 1-4 of the drawings, there is shown therein a bobbin or reel device, generally indicated at 10, which embodies the principles of the present invention. The device 10 consists essentially of a unitary annular body molded of plastic material. It will be understood that any of the well-known plastic materials may be utilized, an exemplary embodiment being polypropylene. The bobbin or reel body includes in general a central hub, generally indicated at 12, first and second sides 14 and 16 extending radially outwardly from the hub in axially spaced relation with respect to one another, and first and second rims 18 and 20. The hub 12, sides 14 and 16 and rims 18 and 20 define an annular chamber 22 for containing a length of strand material, such as a desoldering wick 24, in coil formation. The rims 18 and 20 define a continuous peripheral slot 26 communicating with the outer periphery of the annular chamber of a size to permit the free end portion of the strand material 24 to extend therethrough in controllably engaged fashion. It will be noted that the cross-sectional configuration of the coil formation has a dimension measured in the axial direction which is substantially greater than the smallest transverse dimension of the strand material 24 itself.

The hub 12 is formed by an outer cylindrical wall portion 28, the exterior surface of which defines the inner periphery of the chamber 22, a concentric inner cylindrical wall portion 30 and an interconnecting web or annular wall 32 extending in a radial direction between the central exterior periphery of the inner cylindrical wall 30 and the central interior periphery of the outer cylindrical wall 28.

As best shown in FIG. 1, the first side 14 is defined by a plurality of first annularly spaced segmentally shaped wall portions 34 extending between the hub 12 and associated rim 18. As shown, there are 12 segmental wall portions 34 of equal segmental configuration spaced equally from one another. The segmental wall portions 34 define therebetween a plurality of annularly spaced openings 36 which are similarly of segmental configuration, each of the openings having a dimension similar to each of the other openings and to each of the wall portions 34.

As best shown in FIG. 2, the side 16 is formed by a plurality of second annularly spaced wall portions 38 which extend between the hub 12 and the associated rim 20. As shown, the wall portions 38 are each of the same segmental shape and dimension and each is spaced apart from the adjacent wall portion an equal amount so as to define openings 40 therebetween. As shown, there are 12 wall portions 38 defining 12 openings 40, the wall portions and openings being of the same dimensions with respect to one another and with respect to the wall portions 34 and openings 36.

First rim 18 includes a first continuous cylindrical peripheral wall portion 42 which extends axially inwardly from the radially outward ends of the segmental wall portions 34. The first rim 18 also includes a first continuous frustoconical peripheral wall portion 44 which has its small diameter joined with the axially inner end of the cylindrical wall portion 42 and its large diameter end aligned with the axially outward end of the cylindrical wall portion 42. The slope of the frustoconical wall portion 44, as shown, is approximately 45°. The inner juncture between the cylindrical wall portion and the frustoconical wall portion is a sharp edge defined by continuations of the interior cylindrical surface of the wall portion 42 and the frustoconical exterior surface of the wall portion 44. The frustoconical portion of the junction defines one side of the continuous slot 26.

The second rim 20 includes a second continuous cylindrical peripheral wall portion 46 which extends axially inwardly from the radially outward ends of the segmental wall portions 38. The second rim 20 also includes a second continuous frustoconical peripheral wall portion 48 which has its small diameter joined with the axially inner end of the cylindrical wall portion 46 and its large diameter end aligned with the axially outward end of the cylindrical wall portion 46. The slope of the frustoconical wall portion 48 as shown is approximately 42°. The inner juncture between the cylindrical wall portion 46 and frustoconical wall portion 48 is defined by a transition surface parallel with the frustoconical surface 44 which defines the other side of the continuous slot 26.

It can be seen that with the construction described above the annular bobbin body 10 is capable of being molded in one piece with the provision of two die elements which move axially toward and away from one another and two die elements which move toward and away from one another with radial and axial components and specifically in a direction generally parallel with the approximately 45° angle of the frustoconical surface 44. The disclosed arrangement has the advantage that the free end of the length of strand material 24, when extended through the slot configuration, must be curved to conform with the slant provided by the continuous frustoconical surfaces which define the slot 26. The necessity to curve the wick provides effective control. It is also important to note that the opposite end portion of the wick 24 is disposed in the package so as to extend outwardly through an opening 40 (or 36 if desired) to an exterior position readily accessible to an electrical lead such as utilized in practicing the invention of U.S. Pat. No. 4,078,714.

It is important to note that while the axial dimension of the chamber 22 is shown in the drawings as being greater than the width of the wick 24, it is within the contemplation of the present invention to construct the chamber so that its axial dimension is substantially the same as the width of the wick, so that when the wick is wound on the bobbin the width of each layer is aligned with the width of the layer adjacent to it. Moreover, it is important to note that while the slot configuration will normally apply a friction controlling the movement of the free end of the wick outwardly of the bobbin, such friction is not desirable during the winding operation and it is contemplated that the present bobbin will be wound with the use of equipment providing a conical roller engaging one of the surfaces 44 so as to deflect the portion of the rim engaged outwardly at the position through which the strand material is extended into the chamber during the winding operation. Alternatively two such rollers may be provided engaging opposite surfaces 44 and deflecting both rims outwardly at the point of entry of the wick. After winding the conical shaped roller or rollers are removed from engagement with the rim surface or surfaces 44, enabling the rims to simply deflect back into their normal position wherein the slot defining surfaces provide the aforesaid controlled frictional engagement.

In FIG. 5 there is disclosed a modified arrangement providing a symmetrical slot in which corresponding wall portions are designated by corresponding prime numerals. In this modified construction the inner juncture between the first cylindrical wall portion 42' and first frustoconical portion 44' is defined by a radially extending annular surface which defines one side of a symmetrical radially extending continuous slot 26'. The inner juncture between the second cylindrical wall portion 46' and the second frustoconical wall portion 48' is defined by a radially extending annular surface which defines the other side of the symmetrical continuous slot 26'. The arrangement of FIG. 5 permits the peripheral die elements to move toward and away from one another in a purely radial direction without any axial component. With the symmetrical arrangement of FIG. 5, control of the free end portion of the strand material is achieved by making the distance between the radially extending surfaces defining the continuous symmetrical slot 26' slightly less than the thickness or smallest transverse cross-sectional dimension of the strand material.

It will be understood that the interior surfaces of the wall portions 34 define the first side of the coil receiving chamber 22, these surfaces being defined during the molding operation by a die structure which is movable axially through the openings 40 in the second side 16. Consequently, openings 40 provide axial accessibility to all of the interior surfaces of the wall portions 34. Similarly, the interior surfaces of the wall portions 38 define the second side of the coil receiving chamber 22, these surfaces being defined during the molding operation by a die structure which is axially movable through the openings 36 in the first side 14. Here again, the openings 36 provide for axial accessibility to all of the interior surfaces of the wall portions 38. The die structures forming the interior surfaces of the segmental wall portions 34 and 38 are thus segmental shaped and, when moved into operative relation, effectively interdigitate with respect to one another so that their exterior peripheries define the continuous interior cylindrical surfaces of the wall portions 42 and 46 and the continuous exterior cylindrical surface of the hub cylindrical wall 28. It will be likewise understood that the radial or peripheral die elements will provide semi-cylindrical flanges having cooperating semi-cylindrical interior surfaces which engage the continuous periphery of the axial die structures to provide for the communication of the slot 26 or 26' with the chamber 22 or 22'.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A device for containing a length of strand material in a coil formation having a cross-sectional configuration with a dimension measured in the axial direction which is substantially greater than the smallest transverse dimension of the strand material and for controllably dispensing successive free end portions thereof comprising a unitary annular body molded of plastic material defining an annular chamber of a size to receive therein the coil of strand material and a continuous annular slot communicating with the outer periphery of said annular chamber of a size to permit the free end portion of the strand material to extend therethrough in controllably engaged fashion, said body including a central hub, first and second sides extending generally radially outwardly from said hub in axially spaced relation with respect to one another, and first and second continuous rims at the radially outward ends of said first and second sides respectively defining said continuous slot, said first side having a plurality of first annularly spaced portions extending between said hub and said first rim, said first annularly spaced portions defining a plurality of first axially extending openings in said first side communicating with said annular chamber so as to provide for the free exterior communication of the exposed surfaces of a coil of strand material contained therein, said second side having a plurality of second annularly spaced portions extending between said hub and said second rim, said second plurality of annularly spaced portions defining a plurality of second axially extending openings in said second side communicating with said annular chamber so as to provide for the free exterior communication of the exposed surfaces of a coil of strand material contained therein, said first annularly spaced portions having first interior surfaces defining closed portions of the first side of said annular chamber all of which are axially accessible through said second openings, said second annularly spaced portions having second interior surfaces defining closed portions of the second side of said annular chamber all of which are axially accessible through said first openings.

2. A device as defined in claim 1 wherein the shape of said second axially extending openings conforms with the shape of said first annularly spaced portions and the shape of said first axially extending openings conforms with the shape of said second annularly spaced portions.

3. A device as defined in claim 2 wherein the shape of said first annularly spaced portions conforms with the shape of said second annularly spaced portions.

4. A device as defined in claim 3 wherein there are twelve segmentally shaped first annularly spaced portions.

5. A device as defined in claim 1, 2, 3 or 4, wherein said first rim includes a first cylindrical wall portion extending axially inwardly from the radially outer ends of said first annularly spaced portions and a first frustoconical wall portion joined at its smaller diameter end with the axially inward end of said first cylindrical wall portion and having its larger diameter end generally radially aligned with said first side, said second rim including a second cylindrical wall portion extending axially inwardly from the radially outer end of said second annularly spaced portions and a second frustoconical wall portion joined at its smaller diameter end with the axially inward end of said second cylindrical wall portion and having its large diameter end generally radially aligned with said second side.

6. A device as defined in claim 5 wherein said continuous slot is defined on one side by a continuation of the exterior surface of said first frustoconical wall portion at the juncture thereof with said first cylindrical wall portion and on the other side by a generally parallel transition surface at the juncture of said second frustoconical wall portion with said second cylindrical wall portion.

7. A device as defined in claim 5 wherein said continuous slot is defined by parallel radially extending transition surfaces at the junctures of said first and second frustoconical wall portions with said first and second cylindrical wall portions respectively.

8. A package comprising:
a length of strand material in the form of a desoldering wick of braided wire having a coating of rosin thereon,
a unitary annular body molded of plastic material including a central hub, first and second sides extending generally radially outwardly from said hub in axially spaced relation with respect to one another, and
first and second continuous rims at the radially outward ends of said first and second sides respectively, said hub sides and rims defining an annular chamber receiving therein said length of strand material in coil formation, said rims defining a continuous annular slot communicating with the outer periphery of said annular chamber of a size to permit the free end portion of the length of strand material in coil formation to extend therethrough in controllably engaged fashion,
said first side having a plurality of first annularly spaced portions extending between said hub and said first rim, said first annularly spaced portions defining a plurality of first axially extending openings in said first side communicating with said annular chamber so as to provide for the free exterior communication of the exposed surfaces of a coil of strand material contained therein,
said second side having a plurality of second annularly spaced portions extending between said hub and said second rim, said second plurality of annularly spaced portions defining a plurality of second axially extending openings in said second side communicating with said annular chamber so as to provide for the free exterior communication of the exposed surfaces of a coil of strand material contained therein,
said first annularly spaced portions having first interior surfaces defining closed portions of the first side of said annular chamber all of which are axially accessible through said second openings,
said second annularly spaced portions having second interior surfaces defining closed portions of the second side of said annular chamber all of which are axially accessible through said first openings.

9. A package as defined in claim 8 wherein the opposite end of said length of strand material extends axially outwardly from said hub through one of said openings.

* * * * *